3,043,871
Patented July 10, 1962

3,043,871
PRODUCTION OF HEPTADECANE-DICARBOXYLIC ACID-1,17
Karl Büchner, Oberhausen-Sterkrade, Otto Roelen, Oberhausen-Holten, Josef Meis, Oberhausen-Osterfeld, and Helmut Langwald, Oberhausen-Holten, Germany, assignors to Ruhrchemie Aktiengesellschaft, Oberhausen-Holten, Germany, a corporation of Germany
No Drawing. Filed Aug. 29, 1957, Ser. No. 681,124
Claims priority, application Germany Sept. 3, 1956
6 Claims. (Cl. 260—537)

This invention relates to new and useful improvements in the production of heptadecane-dicarboxylic acid-1,17 ($C_{19}H_{36}O_4$).

Heptadecane-dicarboxylic acid-1,17 due to its long unbranched chain may be used to produce valuable esters and polyesters which are suitable components in copolymerizing polyester resins. The heptadecane-dicarboxylic acid-1,17 may be produced by heating heptadecane-tetracarboxylic acid (1,1,17,17): by heating cyclononane decanone with chromium trioxide in acetic acid on a water bath or from the diketodiester of heptadecane-dicarboxylic acid obtained by the Grignard reaction.

One object of this invention is a novel process for the production of heptadecane-dicarboxylic acid-1,17 from readily available unsaturated fatty acids. This and still further objects will become apparent from the following description:

In accordance with the invention it has surprisingly been found that heptadecane-dicarboxylic acid-1,17 may be produced in a simple manner from substantially straight chain unsaturated $C_{18}$ fatty acids such as the naturally occurring unsaturated $C_{18}$ fatty acid as for example oleic acid or unbranched isomers thereof by subjecting this acid to the oxo synthesis to form the corresponding formyl carboxylic acid, and converting the formyl carboxylic acid to the dicarboxylic acid by treatment with molten alkali possibly after a hydrogenation of the methylal group to the corresponding methylol group and a hydration with water under pressure.

The starting unsaturated $C_{18}$ fatty acid may be any of the known unsaturated $C_{18}$ fatty acids having a substantially straight chain. Naturally occurring unsaturated $C_{18}$ fatty acids such as oleic acid or unbranched isomers thereof are preferably used though $C_{18}$ carboxylic acids having several unsaturated carbon-carbon linkages, as for example linoleic acid or linolenic acid or mixtures of these with oleic acids may be used.

The conversion of the starting fatty acid to the formyl carboxylic acid is effected in accordance with the well known oxo synthesis in which the unsaturated acid is contacted with a carbon monoxide-hydrogen containing gas under pressure in the presence of a catalyst, as for example, a cobalt catalyst supplying cobalt carbonyl hydride. The starting catalyst may for example be in the form of an aqueous cobalt solution though any of the conventional or known oxo catalysts may be used.

Though the oxo synthesis may be effected under any of the known oxo conditions same is preferably effected in accordance with the method of copending application Serial No. 681,125, now abandoned, in which the oxo catalyst is first pre-contacted in a reaction zone with the carbon monoxide-hydrogen containing gas preferably in the presence of iron and an inhibitor as for example hydroquinone at an elevated temperature and pressure as for example at a pressure of about 200 kg./sq. cm. and a temperature about 150° C. for about 10 to 20 minutes in order to pre-form the cobalt carbonyl hydride. The unsaturated acid is then passed into the reaction zone at a rate not substantially in excess of the rate of the addition of the carbon monoxide and hydrogen thereto. The fatty acid is preferably introduced into the reaction zone at such a rate that the pressure remains substantially constant as for example at about 280 kg./sq. cm. The introduction also is preferably effected so that the temperature remains substantially constant as for example between about 158–160° C.

The oxo synthesis, and in particular when operating in accordance with the above described method, converts the double bond forming the corresponding formyl carboxylic acid.

The formyl carboxylic acid may then, if desired, be hydrated under pressure in accordance with German Patent No. 879,837, (United States patent application Serial No. 316,068, now issued to Patent No. 2,810,680) to free the same from residual quantities of catalyst and may, if desired, be hydrogenated in the well known manner, to convert the aldehyde group to an alcohol group.

The aldehyde or the alcohol group is then converted to the corresponding carboxylic acid group in the conventional manner by treatment with molten alkali.

The heptadecane-dicarboxylic acid-1,17 thus obtained, may be separated from the reaction mixture obtained after the treatment with the molten alkali by dissolving the product in water, neutralizing the aqueous strongly alkaline salt solution with mineral acid to obtain a pH between about 8.1–8.3, separating the voluminous precipitate which forms by filtration, washing the precipitate with water, and thereafter completely decomposing the salt with mineral acid added in amount sufficient to obtain a pH of about 2. The dicarboxylic acid thus obtained is dehydrated and may be recrystallized from hydocarbons such as benzene, or aliphatic paraffin hydrocarbon such as heptane. After one crystallization from heptane, the dicarboxylic acid for example, shows the following characteristics:

Neutralization number _____ 325
Saponification number _____ 325
Hydroxyl number _____ 0
Carbonyl number _____ 0
Melting point _____° C__ 116–118

Alternately the alkaline salt mixture obtained by the treatment with the molten alkali may be contacted with a sufficient amount of mineral acid to produce a pH of about 2 which results in the setting free of carboxylic and dicarboxylic acids. These liberated carboxylic and dicarboxylic acids may then be treated with heptane at room temperature after removal of the water. In this treatment the $C_{18}$ monocarboxylic acid and branched $C_{19}$ dicarboxylic acids pass into solution while the heptadecane-dicarboxylic acid-1,17 remains undissolved and thus may be separated from the other components.

The formation of a heptadecane-dicarboxylic acid-1,17 from the oleic acid or isooleic acids through the oxo synthesis is completely surprising and unexpected. When for example oleic alcohol is reacted with a mixture of carbon monoxide and hydrogen in accordance with the oxo synthesis, the hydroxy aldehyde mixture obtained consists of isomers of the formula $$CH_3-(CH_2)_8CHCHO-(CH_2)_7-CH_2OH$$

and $$CH_3-(CH_2)_7-CH(CHO)-(CH_2)_8-CH_2OH$$

which in turn, upon treatment with molten alkali, yields heptadecane-dicarboxylic acid-1,9 (α-octyl azelaic acid)

$$CH_3-(CH_2)_7-CH(COOH)-(CH_2)_8-COOH$$

and heptadecane-dicarboxylic acid-1,8 (α-nonyl suberic acid)

$$CH_3-(CH_2)_8-CH-(COOH)-(CH_2)_7-COOH$$

(See German Patent 745,265.)

It therefore would normally be expected that corresponding acids would be obtained by the treatment of oleic or isooleic acids and it could never have been expected that the heptadecane-dicarboxylic acid-1,17 would be obtained.

The following examples are given by way of illustration and not limitation:

Due to its large unbranched chain the $C_{17}$ dicarboxylic acid-1,17 is highly suitable for the preparation of common esters and polyesters. Esterification of this acid with glycol up to a molecular weight of about 15,000 yields a polyester having desirable spinning properties. These esters may also very advantageously be employed as softeners in the preparation of plastics. Until now the very lengthy and costly method for the production of $C_{17}$ dicarboxylic acid-1,17 did not allow the employment of this acid in the preparation of plastics.

For the preparation of $C_{17}$ dicarboxylic acid-1,17 according to the invention straight chain non-saturated $C_{18}$-fatty acids are suitable for starting material. The oxo synthesis may be carried out in the well known way with this kind of fatty acids as, for example, according to the statements of Roelen in his U.S.A. Patent 2,327,066 employing the catalyst mentioned therein. It is especially advantageous to employ catalysts containing or forming cobalt carbonyl compounds for example cobalt carbonyl hydrogen. Of course aqueous cobalt sulphate solutions may be employed as catalyst, containing for example 25 grams metallic cobalt to the liter. With cobalt sulphate solutions it is advantageous to work in the presence of iron powder and hydroquinine. Under these conditions the addition of water gas takes place at 145–180° C. and at a pressure of 250–300 kg./sq. cm.

It is of special advantage to first fill the reaction vessel with an aqueous cobalt sulphate solution containing 25 grams cobalt metal to the liter. 200 grams pulverized iron and 4 grams hydroquinone are added to this solution. Water gas is first passed into this solution for 15 minutes at a pressure of about 270–300 kg./sq. cm. and a temperature of 140–160° C. for the purpose of producing cobalt carbonyl hydroxide, the latter being, as is well known, a very effective oxo synthesis catalyst. The oleic acid is then added to this pre-treated cobalt sulphate solution for conversion raising the temperature for example up to 180° C. The gas pressure goes down as a result of the carbon monoxide and hydrogen being taken up, is compensated for by the further passing in of water gas to hold the pressure at 280 kg./sq. cm.

The hydration of the primary reaction products resulting is carried out for example at 190° C. by treatment with water at a pressure of 18–20 kg./sq. cm. About 30–60 minutes is required for this step. Thereby the metallic impurities taken up in the process of the water gas addition are precipitated and any acetals present in the reaction product are split up. Following the hydration and removal of water the conversion of the primarily formed aldehyde groups into the corresponding alcohol groups takes place by treatment with gases containing hydrogen, preferably with hydrogen nitrogen mixtures for example at 135–180° C. and at a pressure of 50–150 kg./sq. cm. Cobalt catalysts or nickel catalysts are employed as obtained from their corresponding salt solutions by precipitation.

Hydorgenation of the aldehydes primarily formed is not necessarily required for the subsequent treatment with molten alkali which as such is employed in the well known way for preparation of the carboxylic group. The treatment with molten alkali may also be carried out with the aldehyde carboxylic acid primarily formed. The treatment with molten alkali is carried out for example at temperatures of 280–300° C. For obtaining the free acid the alkaline salts as produced by the treatment with molten alkali are dissolved in four times the volume of water, this step to be followed by acidification with mineral acids, preferably with sulphuric acid up to pH value of 2. Then the reaction mixture is boiled for a lengthy period of time for example for 2 hours and agitated thoroughly for the purpose of decomposing any alkaline soaps and metallic soaps still present.

Example 1

3000 ml. of an aqueous cobalt sulfate solution containing 16 grams/liter of cobalt, 3000 ml. of commercial oleic acid (a mixture of oleic acid and isooleic acid), and 50 grams of iron powder were filled into a horizontal autoclave with stirrer having a capacity of 9.6 liters. The characteristics of the oleic acids were as follows:

| | |
|---|---:|
| Neutralization number | 195 |
| Saponification number | 195 |
| Hydroxyl number | 1 |
| Carbonyl number | 11 |
| Iodine number | 92 |
| Density at 20° C | 0.893 |
| Refractive index, $n_D^{20}$ | 1.4614 |

This mixture was subjected to the catalytic addition of water gas in usual manner. In this step, temperatures of 180–182° C., pressures of 180–250 kg./sq. cm., and an oxonation period of 12 hours were required until the absorption of gas was completed. After this time, the iodine number of the reaction product had dropped to 3. The oleic acid formyl, after separation from the aqueous catalyst solution, were treated in as such known manner for 1 hour with water under pressure at 190° C. and, after separation from the water, treated with alkali at melting temperature using 480 grams of potassium hydroxide per 100 grams of oleic acid formyl which corresponds to a 20% excess as compared with the calculated quantity.

The splitting-off of hydrogen started at 245° C. and was terminated after 3 hours, in which time the temperature gradually increased to 335° C. With a free gas space of about 2 liters for an autoclave of 3.4 liters' capacity, the hydrogen split off had reached a pressure of 75 kg./sq. cm. This hydrogen pressure was then released to 20 kg./sq. cm. and 1 liter of water from a pressure vessel was injected by means of hydrogen into the melt while stirring. The result of this measure was that the product of the treatment with molten alkali was obtained in form of an easily removable paste. From this paste, the carboxylic acid mixture was set free by adding 20% sulfuric acid and was then freed from mineral acid by washing. The characteristics of the mixture were as follows:

| | |
|---|---:|
| Neutralization number | 284 |
| Saponification number | 284 |
| Hydroxyl number | 0 |
| Carbonyl number | 8 |
| Setting point ° C | +30 |

If this mixture was mixed with the same amount of heptane, heated to 80° C. and then cooled to room temperature, there was obtained a crystalline precipitate which was separated from the heptane-soluble portions by filtration and showed the following characteristics:

| | |
|---|---:|
| Neutralization number | 327 |
| Saponification number | 327 |
| Iodine number | 0 |
| Hydroxyl number | 0 |
| Carbonyl number | 5 |
| Melting point ° C | 114–116 |

After another recrystallization, the neutralization and saponification numbers increased to 331 and the melting point to 117–118° C. Chain branching was not revealed by the infrared spectrum. Therefore, the product was heptadecane-dicarboxylic acid-1,17 which has a melting point of 119° C. and neutralization and saponification numbers of 339.

Example 2

The following characteristics were found for a mixture of $C_{18}$ unsaturated fatty acids:

Neutralization number ----------------------- 191
Saponification number ----------------------- 191
Iodine number ------------------------------- 122
Hydroxyl number ----------------------------- 3
Carbonyl number ----------------------------- 6

As indicated by the iodine number of 122 (iodine number for oleic acid, 90–95), this mixture contained about 32–35% of linoleic acids.

1000 ml. of aqueous cobalt sulfate solution, 10 grams of iron powder, and 0.25 gram of hydroquinone were added to an autoclave with stirrer having a capacity of 3.7 liters. After displacement of the air, the autoclave was exposed to a water gas pressure of 200 kg./sq. cm. Thereafter, the reaction mixture was preheated to 145–150° C. while stirring and maintained at this temperature for 20 minutes. The temperature was then increased to 160–165° C. and 1.5 liters of the $C_{18}$ fatty acid mixture mentioned above were injected into the autoclave within 135 minutes at a uniform rate by means of a high pressure pump. The pressure in the autoclave remained at a practically constant level of 280 kg./sq. cm. during the injection and the temperature was likewise at a constant level of 158–160° C.

After the quantity of fatty acid mentioned above was injected, the addition of water gas was continued for 80 minutes. During this time, the pressure which now decreased was made up two times from 220 to 260 kg./sq. cm.

In processing the reaction product to heptadecane-dicarboxylic acid-1,17, the same steps as described in Example 1 up to and including the treatment with alkali at melting temperature were applied. The product from the alkali treating step was dissolved in four times its quantity of hot water and the solution which was still strongly alkaline was neutralized to pH 8.3–8.1 by adding hydrochloric acid at 75° C. On cooling at this pH, a considerable amount of a white precipitate deposited which was separated by filtration and washed with water. The still moist precipitate was suspended in 2 liters of water and mixed with sufficient hydrochloric acid to obtain a pH of 2. There was obtained a crystalline flaky precipitate of a dicarboxylic acid having the following characteristics:

Neutralization number ----------------------- 290
Saponification number ----------------------- 292

When recrystallized three times from benzene, this dicarboxylic acid showed the following characteristics:

Neutralization number ----------------------- 333
Saponification number ----------------------- 333
Melting point ----------------------- ° C -- 118–119.5
C ----------------------------------- percent -- 69.30
H ----------------------------------- do ---- 11.05
O ----------------------------------- do ---- 19.41

The ultrared spectrum did not real chain branching. Elementary analysis resulted in the empirical molecular formula $C_{19.2}H_{36.4}O_4$. The mixed melting point of this acid with the heptadecane-dicarboxylic acid-1,17 produced from oleic acid according to Example 1 was 116–118° C. Therefore, the two acids are identical and demonstrated to be heptadecane-dicarboxylic acid-1,17.

We claim:

1. Process for the production of pure heptadecane-1,17-dicarboxylic acid which comprises catalytically adding carbon monoxide and hydrogen to a mixture of straight chain $C_{18}$ unsaturated carboxylic acids in accordance with the oxo-synthesis to thereby form the corresponding formyl carboxylic acids, oxidizing said formyl carboxylic acids with molten alkali to form the corresponding alkaline dicarboxylic acid salts, contacting the salts with a strong acid and recovering pure heptadecane-1,17-dicarboxylic acid from the mixture by treating the mixture with an about equal amount of heptane whereby the other acids pass into solution while the heptadecane-1,17-dicarboxylic acid remains undissolved.

2. Process according to claim 1 in which said mixture of unsaturated carboxylic acids contains acids selected from the group consisting of oleic acid, iso-oleic acid, linoleic acid, and linolenic acid.

3. Process for the production of pure heptadecane-1,17-dicarboxylic acid which comprises catalytically adding carbon monoxide and hydrogen to a straight chain $C_{18}$ unsaturated carboxylic acid mixture in accordance with the oxo-synthesis to thereby form the corresponding formyl carboxylic acids, oxidizing said formyl carboxylic acids with molten alkali to form the correspondng alkaline dicarboxylic acid salts, contacting the salts with an amount of strong acid sufficient to liberate the free acids and separating pure heptadecane-1,17-dicarboxylic acid from the acid mixture by treating the mixture with an about equal amount of heptane whereby the other acids pass into solution while the heptadecane-1,17-dicarboxylic acid remains undissolved.

4. Process according to claim 3 in which said carboxylic acid mixture is a mixture containing acids selected from the group consisting of oleic, iso-oleic, linoleic, and linolenic acids.

5. Process for the production of pure heptadecane-1,17-dicarboxylic acids which comprises catalytically adding carbon monoxide and hydrogen to a mixture of straight chain $C_{18}$ unsaturated carboxylic acids in accordance with the oxo-synthesis to thereby form the corresponding formyl carboxylic acids, oxidizing said formyl carboxylic acids with molten alkali to form the corresponding alkaline dicarboxylic acid salts, dissolving said alkaline dicarboxylic acid salts in water, adding a strong acid to said aqueous solution to obtain a pH between about 8.1 and 8.3 and thereby obtain a precipitate, washing the precipitate with water, adding additional strong acid to the washed precipitate, to obtain a pH of about 2.0 and recovering the pure heptadecane-1,17-dicarboxylic acid thereby formed by treating the reaction mixture with an about equal amount of heptane whereby the other acids pass into solution while the heptadecane-1,17-dicarboxylic acid remains undissolved.

6. Process according to claim 5 in which said acid mixture is a mixture of acids selected from the group consisting of oleic acid, iso-oleic acid, linoleic acid, and linolenic acid.

References Cited in the file of this patent

UNITED STATES PATENTS

| | | |
|---|---|---|
| 2,610,203 | Hagemeryer et al. | Sept. 9, 1952 |
| 2,686,200 | Lo Cicero et al. | Aug. 10, 1954 |
| 2,717,266 | Lemieux | Sept. 6, 1955 |
| 2,782,215 | Smith et al. | Feb. 19, 1957 |
| 2,801,263 | Hasek et al. | July 30, 1957 |
| 2,810,680 | Buchner et al. | Oct. 22, 1957 |
| 2,891,084 | Alm et al. | June 16, 1959 |

FOREIGN PATENTS

| | | |
|---|---|---|
| 745,265 | Germany | Mar. 1, 1944 |